(12) United States Patent
Hague

(10) Patent No.: US 9,766,142 B1
(45) Date of Patent: Sep. 19, 2017

(54) MAGNETIC FORCE SENSOR SYSTEMS AND METHODS

(71) Applicant: Cory S. Hague, Aliso Viejo, CA (US)

(72) Inventor: Cory S. Hague, Aliso Viejo, CA (US)

( * ) Notice: Subject to any disclaimer, the term of this patent is extended or adjusted under 35 U.S.C. 154(b) by 262 days.

(21) Appl. No.: 14/664,373

(22) Filed: Mar. 20, 2015

(51) Int. Cl.
*G01L 1/22* (2006.01)
*G01L 3/10* (2006.01)

(52) U.S. Cl.
CPC .................................... *G01L 3/104* (2013.01)

(58) Field of Classification Search
CPC ............ G01L 1/12; G01L 1/122; G01L 3/104
USPC ...................................................... 73/862.69
See application file for complete search history.

(56) References Cited

U.S. PATENT DOCUMENTS

| | | | | |
|---|---|---|---|---|
| 4,474,069 A * | 10/1984 | Blomkvist | ............... | H01F 3/02 336/20 |
| 6,668,774 B1 * | 12/2003 | Dauer | ...................... | F01L 1/34 123/90.12 |
| 7,446,525 B2 * | 11/2008 | Pullini | ............... | B60C 23/0425 324/207.21 |
| 7,451,641 B2 * | 11/2008 | Pullini | ............... | B60C 23/0408 73/146 |
| 7,583,077 B2 * | 9/2009 | Pullini | ............... | B60C 23/0425 324/207.11 |
| 7,663,362 B2 * | 2/2010 | Kishida | .................. | G01R 33/04 324/244 |
| 7,992,444 B2 * | 8/2011 | Takeuchi | .................. | G01L 1/14 73/722 |
| 8,499,651 B2 * | 8/2013 | Kishida | .................. | B25J 13/081 73/862.391 |
| 8,536,863 B2 * | 9/2013 | Kishida | .................. | G01R 33/04 324/244 |
| 8,590,386 B2 * | 11/2013 | Takeuchi | .................. | G01L 1/14 73/722 |
| 2011/0184557 A1 * | 7/2011 | Takeuchi | ............. | G01R 33/072 700/258 |
| 2015/0253207 A1 * | 9/2015 | Shigeto | ..................... | G01B 7/24 73/862.625 |
| 2015/0338291 A1 * | 11/2015 | Shigeto | .................. | C08G 18/10 73/862.625 |
| 2016/0153846 A1 * | 6/2016 | Inoue | ...................... | G01L 1/125 73/862.632 |

* cited by examiner

*Primary Examiner* — Freddie Kirkland, III
(74) *Attorney, Agent, or Firm* — Donald E. Stout; Stout, Uxa & Buyan, LLP

(57) ABSTRACT

A magnetic force sensor is capable of measuring a wide range of both compressional and tensional forces, with precision and without any accompanying circuitry. The sensor of the invention has the ability to precisely and accurately measure a wide range of forces in extreme environmental conditions.

14 Claims, 3 Drawing Sheets

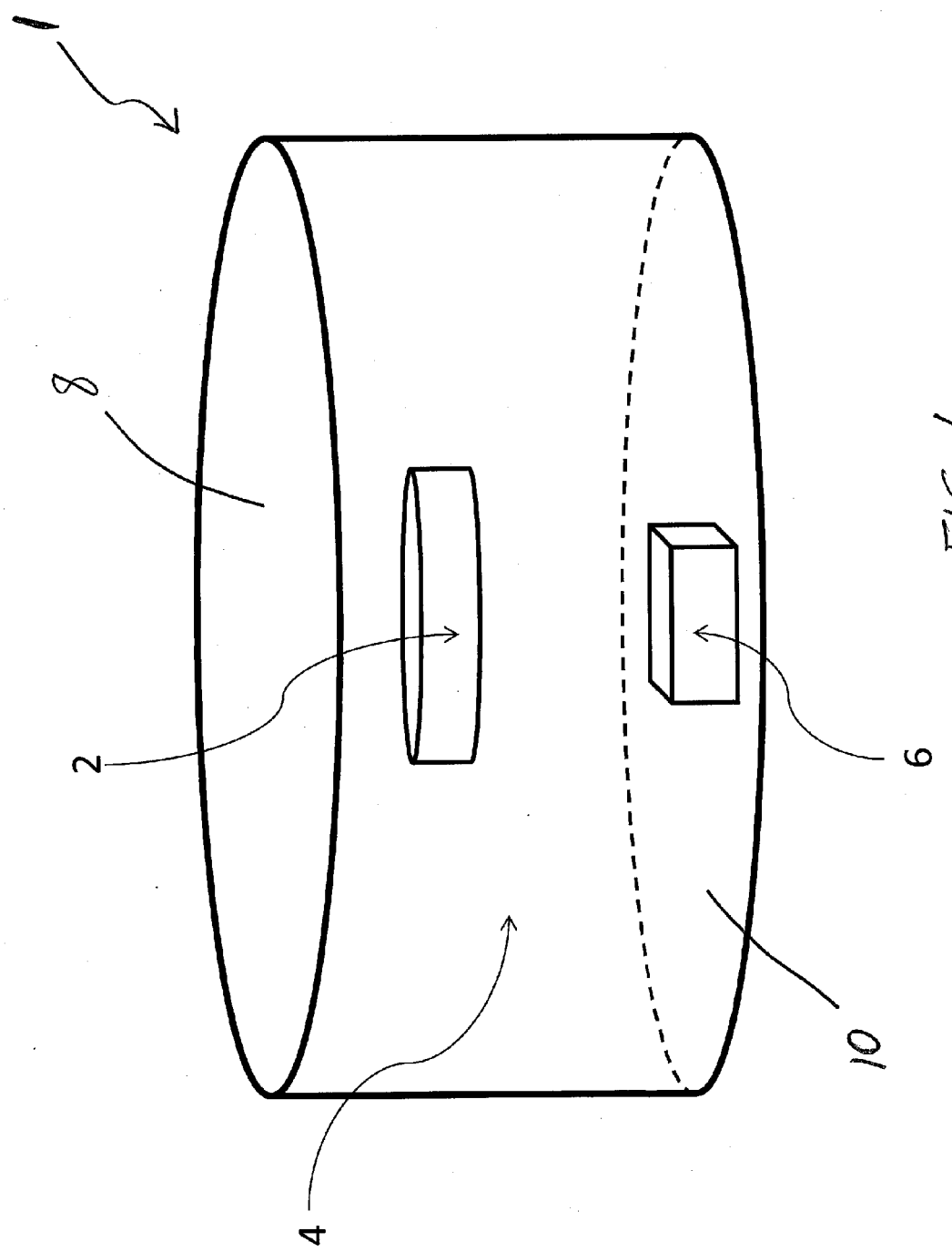

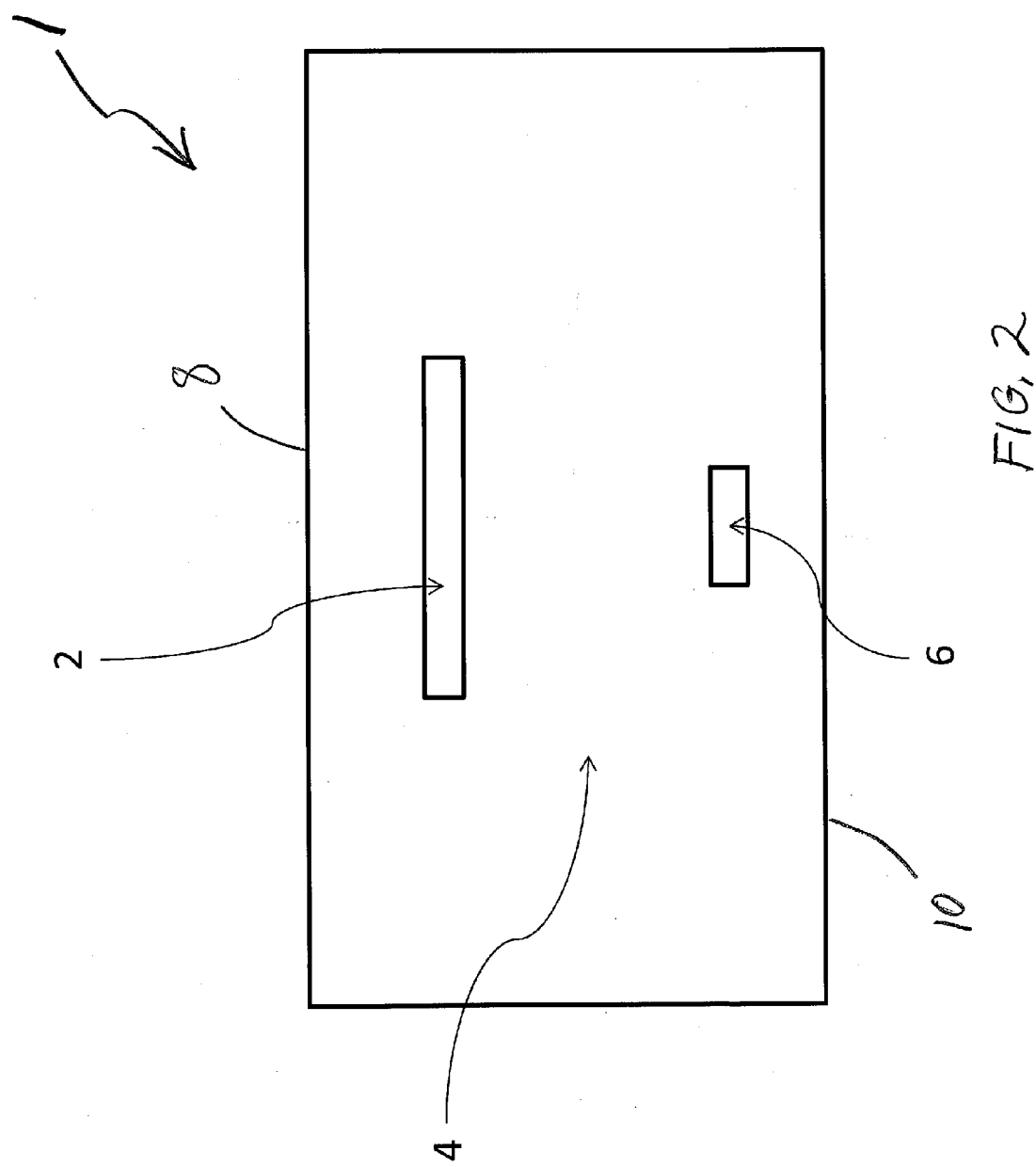

MAGNETIC FORCE SENSOR SYSTEMS AND METHODS

BACKGROUND OF THE INVENTION

There are many applications in which force sensors are necessary to measure how components of a system are interacting with their environment. In some instances, a force sensor is integrated into a system in order to avoid damage to the environment surrounding the system. In others, the purpose for the force sensor is to avoid damage to the component itself. In still others, the purpose is to provide sensory feedback to other parts of a system or to an observer or user of the system.

Many existing transducers that can provide such measurements are often either precise, at the expense of sensitivity, or have a large range of sensitivity at the expense of precision. Most of these transducers also require complicated and bulky circuitry to produce a useful signal. Most existing sensors, without the necessary circuitry, experience hysteresis, large settling time, high noise, and general vulnerability and inaccuracy to and in, respectively, environments outside of the laboratory setting. These sensors typically compensate for their weakness by using multiple sensors in compensating Wheatstone bridges, sophisticated mechanical configurations, using temperature compensators, and using several amplifiers. These methods reduce the aforementioned stated problems, at a certain expense and complexity. However, these problems will still persist in the sensor, albeit perhaps to a lesser extent.

SUMMARY OF THE INVENTION

The present invention provides a magnetic force sensor that is capable of measuring a wide range of both compressional and tensional forces, with precision and without any accompanying circuitry. Advantageously, the sensor of the invention has the ability to precisely and accurately measure a wide range of forces in extreme environmental conditions.

More particularly, in one aspect of the invention there is provided a magnetic force sensor system which comprises a block of consistently deformable material having an outer surface and a magnet suspended within the block of material at a first location. The magnet is capable of generating a stable magnetic field. A magnetic field intensity sensor is suspended within the block of material at a second location spaced a particular distance from the first location. The magnetic field intensity sensor is adapted to detect the intensity of a magnetic field and to generate a responsive output voltage. Thus, in operation, when a particular force is applied to the outer surface, the material deforms to cause the particular distance between the first and second locations to change, thereby changing the intensity of the magnetic field detected by the magnetic field intensity sensor.

The consistently deformable material may comprise silicone, urethane or an elastomeric styrenic block copolymer, as well as any other suitable material. The magnet comprises a permanent magnet, though other types of magnets may be used if desired. The magnetic field intensity sensor comprises a Hall sensor, and may more particularly comprise a ratio metric linear Hall sensor, or a digital Hall sensor, for example. The particular applied force may be either a compressive force or a tensile force. In the case of a compressive force, the particular distance between the first and second locations is decreased, and the magnetic field intensity detected by the magnetic field intensity sensor is increased. In the case of a tensile applied force, the particular distance between the first and second locations is increased, and the magnetic field intensity detected by the magnetic field intensity sensor is decreased.

In certain applications, the outer surface is attached to another surface which applies force to be measured to the outer surface. The block of consistently deformable material may further comprise a second outer surface to which force to be measured may be applied. In the illustrated embodiment, the block of consistently deformable material is generally cylindrical in shape and the outer surface comprises one of a top or bottom surface of the cylinder. The second outer surface of the block comprises the other of the top or bottom surface of the cylinder.

In another aspect of the invention, there is disclosed a method of measuring applied force using a force sensor comprising a block of consistently deformable material having an outer surface, a magnet suspended within the block of material at a first location, and a magnetic field intensity sensor suspended within the block of material at a second location spaced a particular distance from the first location. The method comprises a first step of calibrating the force sensor to determine an output of the magnetic field intensity sensor at steady state (i.e. with no measurable forces, other than atmospheric pressure, applied to the outer surface of the sensor). Remaining steps of the method include positioning the force sensor so that a force to be measured is applied to its outer surface, thereby deforming the block of consistently deformable material, determining any change in output from the magnetic field intensity sensor responsive to the applied force, and calculating the applied force based upon the change in output.

The invention, together with additional features and advantages thereof, may best be understood by reference to the following description taken in conjunction with the accompanying illustrative drawings.

BRIEF DESCRIPTION OF THE DRAWINGS

FIG. 1 is an isometric view illustrating a magnetic force sensor constructed in accordance with the principles of the present invention;

FIG. 2 is a side view of the sensor shown in FIG. 1;

DETAILED DESCRIPTION OF THE INVENTION

Figure 4:
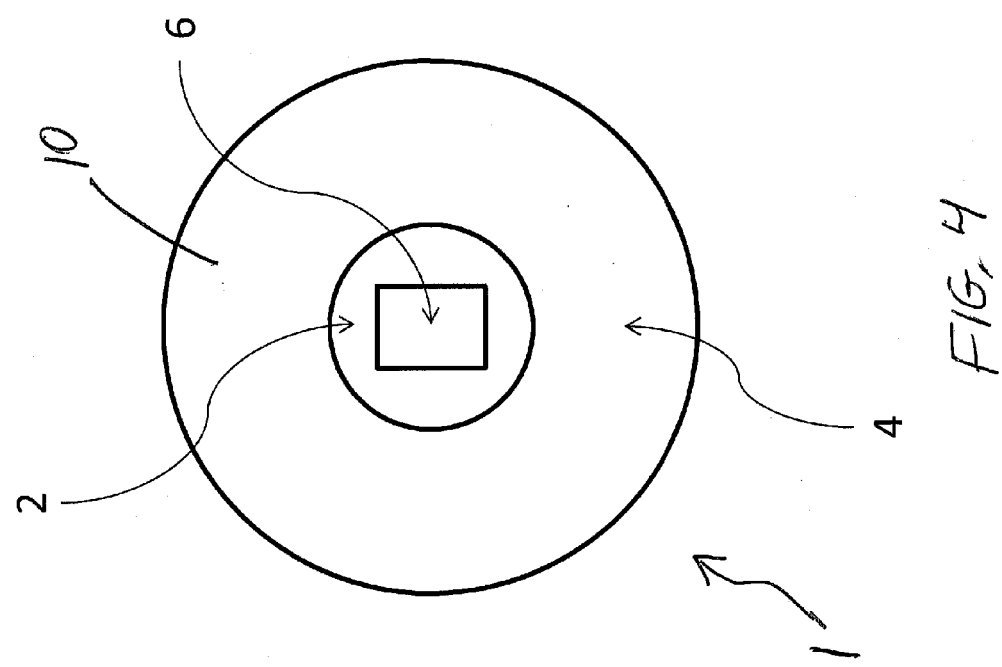
FIG. 4 is a bottom view of the sensor shown in FIGS. 1-3.
Figure 3:
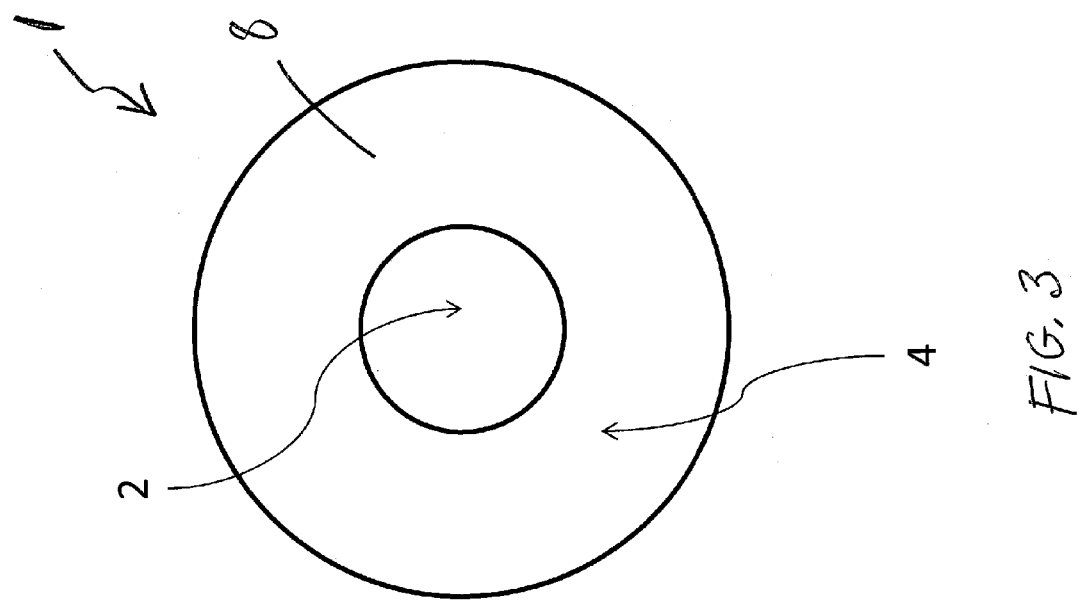
FIG. 3 is a top view of the sensor shown in FIGS. 1 and 2.

Referring now more particularly to the drawings, there is shown in FIG. 1 a magnetic force sensor 1 which is constructed in accordance with one embodiment of the present invention. The sensor 1 comprises a block of material 4 in which a magnet 2 and a Hall sensor 6 are suspended The material 4 comprises a consistently deformable material, such as silicone, urethane, elastomeric styrenic block copolymers, such as that sold under the trade name KRATON, or any other suitable rubber or other deformable material. The magnet 2 may comprise a permanent rare earth magnet, such as neodymium, an electro magnet (for actively adjusting sensitivity), magnetic film, or any other ferromagnetic material. The magnet 2 functions to introduce a stable magnetic field. The Hall sensor 6 may comprise either a ratio metric linear Hall sensor, or a digital Hall sensor, for example, and operates by proportionally changing its output voltage responsive to the intensity of a magnetic field.

The sensitivity of the sensor 6 may be adjusted by altering the durometer of the deformable material 4, adjusting the strength of the magnet 2, or adjusting the normal distance between the magnet 2 and the Hall sensor 6.

Although only one magnet and one Hall sensor are shown in the illustrated embodiment, any number of magnets and any number of Hall sensors may be suspended in the block of consistently deformable material 4 and still be within the scope of the invention.

In operation, the inventive magnetic force sensor 1 is capable of measuring a wide range of both compressional and tensional forces, with precision and without any accompanying circuitry. The sensor functions by responding to compressive or tensional force applied to respective surfaces 8 and 10 of the sensor block 4. In the case of compression, the compressive force functions to deform the material 4 so that the distance between the magnet 2 and sensor 6 diminishes, thereby proportionately increasing the intensity of the magnetic field detected by the Hall sensor. On the other hand, in the case of a tensional force, the block 4 elongates so that the distance between the magnet 2 and sensor 6 increases, thereby proportionately decreasing the intensity of the magnetic field detected by the Hall sensor.

Of course, as noted above, the Hall sensor output comprises a voltage output, which may be in the form of an analog or digital signal, depending upon the type of Hall sensor employed, directly proportional to the sensed magnetic field. Thus, the output voltage is directly proportional to the force applied to the force sensor, along the measurement axis. This voltage output may be read using a voltmeter or multimeter, or may be transmitted to an analog-to-digital converter (ADC) to be utilized with a microcontroller or alternative processor as desired, for any suitable purpose.

The isolation of the Hall sensor from the environment because of its suspension within the deformable material block 4 provides the material the ability to be used in aquatic conditions, such as underwater remotely operated vehicles, submarines, and ships. This isolation also provides the force sensor 1 with a flame resistance, electrostatic discharge resistance, and shock/impact resistance, making the sensor viable for many industries with extreme environments, including manufacturing, automation, aerospace, naval, and military. The sensor may be implemented into any body form or mechanical configuration in order to measure tensional/compressive forces. The sensor may also be implemented by simply adhering the two surfaces 8, 10 along the measurement axis to the surfaces that are to be measured, using, for example, RTV silicone, epoxy, or any other suitable adhesive.

In another modification, a sleeve which is relatively rigid may be disposed about the periphery of the sensor block. The sleeve may be comprised, for example, of a suitable metal, such as aluminum, a suitable plastic, or the like. The purpose for the sleeve is to minimize deformation of the material forming the block 4 in directions other than along an axis running between the surfaces 8 and 10, thereby helping to ensure consistent deformation and results that are as precise as possible. In the illustrated embodiment, wherein the block 4 is cylindrical, the sleeve would also be cylindrical.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention, which is to be limited only in accordance with the following claims.

What is claimed is:

1. A magnetic force sensor system, comprising:
    a block of consistently deformable material having an outer surface;
    a magnet suspended within said block of consistently deformable material at a first location, the magnet being capable of generating a stable magnetic field; and
    a magnetic field intensity sensor suspended within said block of consistently deformable material at a second location spaced a particular distance from the first location, wherein (i) the magnetic field intensity sensor is (a) suspended within said block of consistently deformable material, and (b) not physically fixed to any separate circuit board; (ii) there is no separate circuit board suspended within said block of consistently deformable material, and (iii) the magnetic field intensity sensor is adapted to detect the intensity of a magnetic field and to generate a responsive output voltage;
    wherein when a particular force is applied to the outer surface, the consistently deformable material comprising said block of consistently deformable material deforms to cause the particular distance between the first and second locations to change, thereby changing the intensity of the magnetic field detected by the magnetic field intensity sensor.

2. The system as recited in claim 1, wherein the consistently deformable material forming said block of consistently deformable material comprises silicone, urethane or an elastomeric styrenic block copolymer.

3. The system as recited in claim 1, wherein the magnet comprises a permanent magnet.

4. The system as recited in claim 1, wherein the magnetic field intensity sensor comprises a ratio metric linear Hall sensor.

5. The system as recited in claim 1, wherein the magnetic field intensity sensor comprises a digital Hall sensor.

6. The system as recited in claim 1, wherein the particular force is a compressive force.

7. The system as recited in claim 6, wherein the particular distance between the first and second locations is decreased, and the magnetic field intensity detected by the magnetic field intensity sensor is increased.

8. The system as recited in claim 1, wherein the particular force is a tensile force.

9. The system as recited in claim 8, wherein the particular distance between the first and second locations is increased, and the magnetic field intensity detected by the magnetic field intensity sensor is decreased.

10. The system as recited in claim 1, wherein the outer surface is attached to another surface which applies force to be measured to the outer surface.

11. The system as recited in claim 10, wherein the block of consistently deformable material further comprises a second outer surface to which force to be measured may be applied.

12. The system as recited in claim 11, wherein the block of consistently deformable material is generally cylindrical in shape and the outer surface comprises one of a top or bottom surface of the cylinder.

13. The system as recited in claim 12, wherein the second outer surface of the block of consistently deformable material comprises the other of the top or bottom surface of the cylinder.

14. A method of measuring applied force using a force sensor comprising a block of consistently deformable material having an outer surface, a magnet suspended within said block of consistently deformable material at a first location, and a magnetic field intensity sensor suspended within said block of consistently deformable material at a second location spaced a particular distance from the first location, wherein (i) the magnetic field intensity sensor is (a) suspended within said block of consistently deformable material, and (b) not physically fixed to any separate circuit board, and (ii) there is no separate circuit board suspended with said block of consistently deformable material, the method comprising:

calibrating the force sensor to determine an output of the magnetic field intensity sensor at steady state;

positioning the force sensor so that a force to be measured is applied to its outer surface, thereby deforming the block of consistently deformable material;

determining any change in output from the magnetic field intensity sensor responsive to the applied force; and calculating the applied force based upon the change in output.

\* \* \* \* \*